(12) United States Patent
Fernandez-Mattos et al.

(10) Patent No.: US 12,500,511 B2
(45) Date of Patent: Dec. 16, 2025

(54) CAPACITOR EMBEDDED ROGOWSKI CURRENT DETECTION

(71) Applicant: Hamilton Sundstrand Corporation, Charlotte, NC (US)

(72) Inventors: Rodrigo Fernandez-Mattos, Solihull (GB); Stephen Minshull, Bromsgrove (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 350 days.

(21) Appl. No.: 18/093,685

(22) Filed: Jan. 5, 2023

(65) Prior Publication Data

US 2023/0223838 A1 Jul. 13, 2023

(30) Foreign Application Priority Data

Jan. 10, 2022 (EP) ..................................... 22275003

(51) Int. Cl.
*H02M 1/32* (2007.01)
*G01R 15/18* (2006.01)
(Continued)

(52) U.S. Cl.
CPC ............ *H02M 1/32* (2013.01); *G01R 15/181* (2013.01); *H02M 1/0009* (2021.05); *H02M 3/33569* (2013.01); *H02M 7/53875* (2013.01)

(58) Field of Classification Search
CPC .. H02M 1/0009; H02M 1/32; H02M 3/33569; H02M 7/53875
See application file for complete search history.

(56) References Cited

U.S. PATENT DOCUMENTS 5,815,391 A    9/1998   Pelly
7,309,993 B2  12/2007  Driehorn et al.
(Continued)

FOREIGN PATENT DOCUMENTS

CN    106849021 A      6/2017
EP       2166635 A1    3/2010
JP    2019221070 A    12/2019

OTHER PUBLICATIONS

Extended European Search Report for European Patent Application No. EP22275003.6, dated Jun. 30, 2022.
(Continued)

*Primary Examiner* — Rafael O De Leon Domenech (57) ABSTRACT

An electrical power converter (1, 1', 1") includes a DC link capacitor (3, 3', 3") configured for connection to a DC power source to provide an input load, at least one pair of semiconductor switches (2a, 2b, 2c, 2a', 2b', 2a", 2b") connected in parallel with the DC link capacitor (3, 3', 3") and positioned on either side of an output load terminal (10a, 10b, 10c, 10a', 10b', 10a", 10b"). The electrical power converter (1, 1', 1") further includes an inductive current sensor (12, 12', 12"), arranged to sense a primary current from a terminal of the DC link capacitor (3, 3', 3"), and a detection circuit (14), connected to the inductive current sensor (12, 12', 12") and arranged to monitor for an over-current condition, and to produce an output which causes at least one of the pair of semiconductor switches (2a, 2b, 2c, 2a', 2b', 2a", 2b") to be switched to a non-conducting state when an over-current condition is detected.

20 Claims, 7 Drawing Sheets

(51) Int. Cl.
    *H02M 1/00*      (2006.01)
    *H02M 3/335*     (2006.01)
    *H02M 7/5387*    (2007.01)

(56)          References Cited

U.S. PATENT DOCUMENTS 9,577,421  B2     2/2017  Barker et al.
    10,782,323 B2     9/2020  Parkhideh et al.
    11,114,839 B2     9/2021  Howard et al.
    2014/0176152 A1*  6/2014  Wolbank ............... G01R 31/50
                                                        324/510
    2017/0104404 A1   4/2017  Yu et al.
    2021/0006240 A1   1/2021  Schläfli et al.

OTHER PUBLICATIONS

Votzi, Helmut L., et al: "Low-Cost Current Sensor for Power Capacitors Based on a PCB Rogowski-Coil", PCIM Europe 2011, May 17, 2011 (May 17, 2011), pp. 621-626, XP055930613, Retrieved from the Internet: URL: https://www.riccardofontanini.it/projects/rogowski/pdf/coilsplanar.pdf [retrieved on Jun. 13, 2022].
Texas Instruments: "Understanding the short circuit protection for silicon carbide MOSFETs", TI Tech Notes, SLUA863A—Jan. 2018—Revised Mar. 2019; Copyright © 2018-2019, Texas Instruments Incorporated.
Office Action dated Feb. 10, 2025 in connection with European Patent Application No. 22 275 003.6, 14 pages.
Votzi et al., "Low-Cost Current Sensor for Power Capacitors Based on a PCB Rogowski-Coil", PCIM Europe 2011, May 2011, 6 pages.

* cited by examiner

Figure 7 ical Field

This disclosure relates to an electrical power converter including current detection.

BACKGROUND

Known electrical power converters implement over-current detection using desaturation (Desat) detection which monitors the on-state voltage of the power device and turns the device off if the on-state voltage exceeds a threshold voltage. An example of an electronic power converter using such desaturation detection is shown in FIG. 1.

Figure 1:
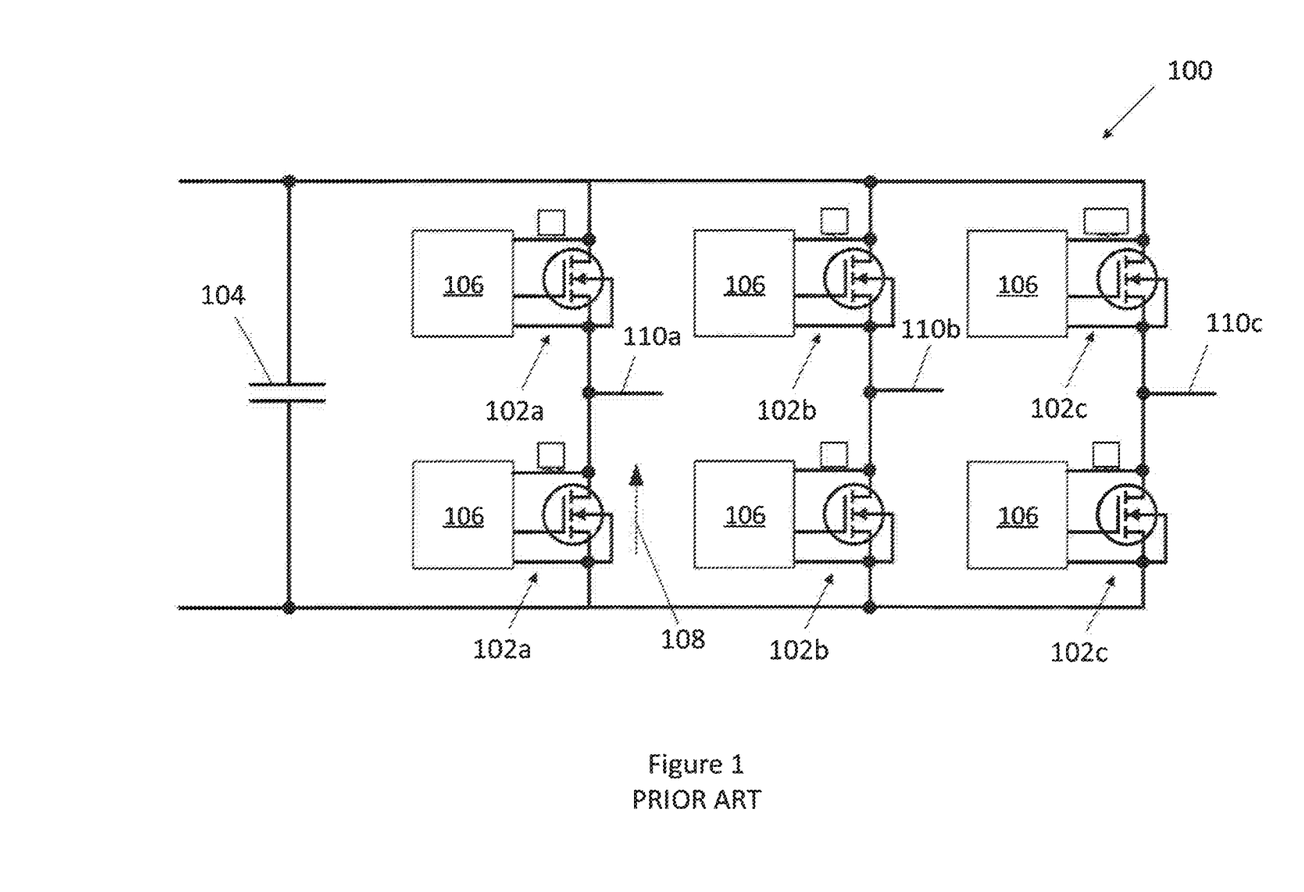
FIG. 1 is a circuit diagram showing an electrical power converter, as is known in the art.

The prior art example illustrated in FIG. 1 shows a three-phase inverter device 100, including a DC link capacitor 104, connected in parallel to three pairs of semiconductor switches 102a, 102b, and 102c (sometimes called "power devices"). The switches 102a, 102b, 102c, are switched in a known manner so that from a DC input (not shown) an AC (alternating current) output is produced on the output load terminals 110a, 110b, 110c, which are connected respectively between each pair of switches. Each of the switches 102a, 102b, 102c is connected to a respective desaturation detection unit 106, which carries out a current detection function.

The on-state voltage is indicative of the current flowing through each of the switches 102a, 102b, 102c and an excessive voltage indicates a short-circuit or shoot-through condition has occurred in the device 100. If, for example, a failure occurs for a pair of switches 102a such that these switches 102a are both turned on at the same time, a large shoot-though current will flow through the switches. The desaturation detection units 106 at these two switches 102a will detect excessive on-state voltage ($V_{ds}$) 108 and intervene to turn off the switches 102a, i.e. to make them non-conductive. If the detection and turn off time are fast enough, then the device can be saved from failure.

However, the response time in the event of failure can be as much as 3 μs or more using such desaturation detection. Whilst this can sometimes be appropriate for some technologies, such as IGBTs where you can have up to 10 μs to protect the device, for other types of technology such as Silicon Carbide switches there is only approximately 2 μs, and therefore the response time of desaturation detection may not be sufficient to protect the devices. Furthermore, since desaturation detection relies on voltage detection, false triggering may occur if the blanking period is not correctly set or because of noise induced voltage spikes due to parasitic elements in the layout or device.

Desaturation detection uses "on-resistance" of a switch to detect an excessive on-state voltage. This on-resistance varies significantly across the working temperature range of these devices, and therefore the performance of the desaturation detections is not consistent with changing temperatures.

It is a goal of the present disclosure to provide an electrical power converter which addresses some of these shortcomings.

SUMMARY

According to a first aspect of this disclosure there is provided an electrical power converter, comprising:
- a DC link capacitor configured for connection to a DC power source to provide an input load;
- at least one pair of semiconductor switches connected in parallel with the DC link capacitor and positioned on either side of an output load terminal;
- an inductive current sensor, arranged to sense a primary current from a terminal of the DC link capacitor; and
- a detection circuit, connected to the inductive current sensor and arranged to monitor for an over-current condition, and to produce an output which causes at least one of the pair of semiconductor switches to be switched to a non-conducting state when an over-current condition is detected.

By arranging an inductive current sensor to sense a primary current from a terminal of the DC link capacitor, and connecting the inductive current sensor with the detection circuit, fast and accurate over-current detection is achieved, and this detection is then used by the detection circuit to switch off at least one of the switches, thus protecting the electrical power converter. When a shoot-through fault condition occurs, a large current is sourced from the DC link capacitor, and thus arranging the inductive current sensor to sense a primary current from a terminal of the DC link capacitor provides a system which is particularly suitable for the detection of over-currents arising due to fault conditions. The described electrical power converter therefore provides fast over-current detection that is less susceptible to false triggering compared with traditional voltage-based de-sat circuits. Furthermore, only one inductive current sensor and detection circuit is needed, e.g. for each DC link capacitor, rather than one desaturation detection unit for each switch, i.e. one inductive current sensor and detection circuit compared to six for a traditional 6-switch inverter implementing desaturation detection.

It will be understood that an inductive current sensor is one which detects a primary current based on a secondary current which is induced by a changing magnetic field resulting from the primary current. In examples of this disclosure, the primary current is the current passing through the DC link capacitor and the inductive current sensor generates a secondary current for detection by the detection circuit. The secondary current is converted to a voltage by the inductive sensor, such that the inductive current sensor produces a voltage, which is induced by the primary current. Thus it will be appreciated that by the inductive current sensor being arranged to sense a primary current from a terminal of the DC link capacitor it is meant that the inductive current sensor is positioned in proximity to the DC link capacitor, or a conductor which is in electrical connection with the DC link capacitor, such that the inductive current sensor is positioned within a magnetic flux which results from a change in current flowing from the DC link capacitor, i.e. sufficiently close to the capacitor or a conductor connected to it that a current (and therefore a voltage) is induced in the inductive current sensor by a magnetic field which is generated by current flowing from the DC link capacitor. The disclosed electrical power converter is thus further advantageous since it detects over-current based on flux rather than using the on-resistance of a switch. The on-resistance of a switch, as used in desaturation detection, has temperature dependent properties, and therefore cannot provide consistent current detection performance across a large temperature range. This problem does not arise in the described electrical power converter, which provides consistent performance across a large temperature range.

The inductive current sensor may comprise any suitable coil arranged to detect the primary current from the terminal of the DC link capacitor based on the secondary current (and therefore voltage) which is induced by a changing magnetic field resulting from the first current. Thus a surge in the primary current (e.g. a shoot-through fault condition) will cause a changing magnetic field that induces the secondary current (which is converted to the voltage) and thus allows over-current detection. It will be appreciated that inductive current sensors respond to changing magnetic fields, whereas Hall effect sensors respond to static magnetic fields. In some examples the inductive current sensor is a current transformer or a Rogowski current sensor.

In some examples the inductive current sensor is a Rogowski current sensor. It will be understood that a Rogowski coil is a device for detecting current (AC or high speed pulses) through a magnetic coupling of a conductor and the Rogowski coil. The Rogowski coil is bent along its central axis (i.e. the axis about which it is coiled) to be wrapped around the conductor. In other words, it is a toroidal winding with an air core, wrapped around a conductor. A Rogowski coil is operated in the MHz regions (1-10 MHz), this means that the response time of a Rogowski coil is approximately 350 ns or less, which is particularly advantageous since it provides very fast over-current detection.

In some examples the inductive current sensor is arranged to sense the primary current from a terminal of the DC link capacitor at a distance from the DC link capacitor. For example, the inductive current sensor comprises a coil wrapped around a current-carrying conductor (e.g. wire) that is (electrically) connected to a terminal of the DC link capacitor.

In some examples the inductive current sensor is arranged to sense the primary current at a terminal of the DC link capacitor. In some examples the inductive current sensor comprises a coil wrapped (at least partly) around a terminal of the DC link capacitor. This means that the inductive current sensor is integrated with the DC link capacitor. In some such examples the inductive current sensor is a Rogowski current sensor comprising a Rogowski coil bent along its central axis to be wrapped around the terminal of the DC link capacitor.

The inventors have recognised that integrating an inductive current sensor with a capacitor can be desirable in a variety of applications as well as in an electrical power converter. Thus, according to a second aspect of this disclosure, there is provided a capacitor (e.g. a DC link capacitor) comprising terminals suitable for connection to a DC power source, and further comprising an inductive current sensor, wherein the inductive current sensor comprises a coil wrapped (at least partly) around one of the terminals of the capacitor. Thus there is provided a DC link capacitor with an inductive current sensor embedded in it. It will be understood that this can be used in an electrical power converter as described above, and provide the advantages as laid out above. By "wrapped around" it will be understood that the coil (either one or more loops of a coil, or the coil itself) at least partially encircles (optionally fully encircles) the terminal of the capacitor. As laid out above, the inductive current sensor may be a Rogowski current sensor.

The capacitor may further comprise a detection circuit, connected to the inductive current sensor and arranged to monitor for an over-current condition, and to produce an output. This detection circuit may have any of the features described below.

In some examples of the capacitor and the electrical power converter, the inductive current sensor is embedded within a printed circuit board (PCB). This provides improved mechanical integrity and robustness of the electrical power converter, since the inductive current sensor (e.g. Rogowski coil) is positioned securely within the PCB and held in place. Ease of installation is also improved, and such devices are freely available, therefore the cost of the electrical power converter is also reduced.

In some examples of the capacitor and the electrical power converter, a printed circuit board, including an embedded inductive current sensor, is mounted to a terminal of the DC link capacitor. For example, the printed circuit board may comprise a hole, though which the terminal of the DC link capacitor (i.e. the terminal for which the sensor is to be arranged to sense a primary current from) can be passed. This means that the printed circuit board can be physically supported by the underlying capacitor.

In some examples of the capacitor and the electrical power converter, the printed circuit board further comprises the detection circuit. This helps to provide a compact sensor arrangement and to ensure secure connection of the detection circuit to the inductive current sensor. In some examples the printed circuit board further comprises a harness connector arranged to enable connection with other components of the electrical power converter. The harness connector may be connected to the detection circuit. This harness connector provides a convenient interface to the rest of the system The detection circuit is arranged to monitor for an over-current condition, and to produce an output which causes at least one of the pair of semiconductor switches to be switched to a non-conducting state when an over-current condition is detected. The detection circuit might cause the semiconductor switch(es) to switch to the non-conducting state directly, i.e. via a direct connection with one or more of the switches. Alternatively the electrical power converter may further comprise at least one driver, arranged to control switching of at least one switch of the pair of semiconductor switches, and the detection circuit may be connected to the driver, and arranged to disable the driver when an over-current condition is detected, thus indirectly making the switch(es) non-conducting via the driver.

The electrical power converter may comprise more than one driver. There may be one driver per pair of semiconductor switches (e.g. controlling each switch of the pair of semiconductor switches individually), or alternatively there may be one driver per each semiconductor switch. The detection circuit may be arranged to control or signal each driver.

In addition to causing at least one switch to be switched to a non-conducting state (i.e. switched off) the detection circuit may take additional action to protect the switch(es) or the electrical power converter overall. In some examples the electrical power converter further comprises a grounding portion, which comprises a ground connection, wherein the detection circuit is connected to the grounding portion and is arranged to connect the gate side of at least one of the pair of semiconductor switches to the ground connection when an over-current condition is detected. The grounding portion may further comprise a semiconductor switch, referred to herein as a grounding semiconductor switch, to distinguish this from the at least one pair of semiconductor switches.

The grounding portion may comprise more than one grounding semiconductor switch, e.g. one for each semiconductor switch to which the detection circuit is connected, for example two ground switches respectively connected to a pair of semiconductor switches. The grounding semiconductor switches may be positioned between respective switches of the pair of semiconductor switches and the ground connection, so that switching on of each grounding semiconductor switch (i.e. switching it to the on-state) connects the respective switch to ground. Both of the semiconductor switches may be triggered by the same signal. The grounding portion may comprise a resistor, to determine the rate at which the pair of semiconductor switches are turned off. It may comprise two resistors, one corresponding to each switch of the pair of semiconductor switches. The resistors may be respectively connected in series with each semiconductor switch, e.g. with the drain of the switch. In this arrangement the resistors determine the rate at which charge is removed from the gate which in turns controls the turn-off speed. This helps to protect the switch during turn-off since if the switch is closed too quickly the device might be damaged. The value of the resistor determines how fast the corresponding switch is turned off.

The detection circuit may be relatively simple, e.g. not requiring a microprocessor. In some examples the detection circuit comprises an integrator, arranged to integrate the voltage generated in the inductive current sensor by the primary current (as a result of the primary current inducing the secondary current). Where the voltage produced by the inductive current sensor is proportional to the derivative of the sensed primary current (e.g. as is the case for a Rogowski coil) integration of this signal by the integrator then produces a signal which is proportional to the sensed primary current. In some examples the detection circuit comprises a comparator, arranged to compare the voltage generated by the inductive current sensor (or the integration of the second current, produced by the integrator) to a threshold. Thus in some examples the threshold is a threshold voltage.

In some examples of the electrical power converter, the at least one pair of semiconductor switches consists of silicon-based switches, optionally silicon carbide switches.

Silicon-Carbide (SiC) devices can switch faster than traditional Silicon (Si) IGBT and MOSFET power switches, they have reduced power losses and are able to operate at higher temperatures compared to traditional Si devices. This allows higher performance, increased efficiencies and higher power densities of the power converters. The described inductive current sensor arrangement achieves faster over-current protection, which is particularly important where Silicon-Carbide switching devices are used, since the time available for detection of an over-current and turning off the power device, so that it is protected, is much shorter than for traditional Silicon devices, for example approximately 3 μs for a Silicon-Carbide switch, compared to at least 10 μs for a traditional silicon switch device.

In some examples of the electrical power converter, the at least one pair of semiconductor switches consists of Metal-Oxide-Semiconductor Field-Effect Transistors (MOSFETs) and/or Insulated-Gate Bipolar Transistors (IGBTs).

In some examples the electrical power converter comprises more than one DC link capacitor, and further comprises more than one inductive current sensor, wherein each inductive current sensor is arranged to sense a primary current from a terminal of a respective DC link capacitor. Thus, in some examples a separate inductive current sensor is provided for each DC link capacitor.

In some examples the electrical power converter comprises three pairs of semiconductor switches, e.g. to convert the DC input load to a three-phase AC output load. In accordance with the examples mentioned above, a driver may be connected to each pair of semiconductor switches, i.e. three drivers are present. The semiconductor switch pairs may each be connected in parallel with the DC link capacitor, so each pair is connected in parallel to each other pair.

In some examples the electrical power converter is a direct current (DC) to alternating current (AC) three-phase inverter. In other examples the device is an H-bridge direct current (DC) to alternating current (AC) converter. In other examples the device is an isolated direct current (DC) to direct current (DC) converter.

In some examples the electrical power converter is configured to provide a power at the output load terminal of at least one kW, optionally of at least two kW, further optionally at least 3 kW. In low power applications (i.e. less than one kW) the same circuit that provides current sensing for control is often also used for protection purposes. However some inductive current sensors (e.g. a Rogowski coil) may not provide the required accuracy for control purposes. The described over-current sensing/detection arrangement is therefore particularly advantageous in higher power systems in which current detection already needs to be carried out separately for control and protection purposes. Rogowski coils in particular produce a very low sense signal in low current conditions, and are therefore particularly well suited to high-power applications, e.g. of at least one kW.

In some examples of the electrical power converter, the output load terminal is connected to an electrical motor, e.g. an electrical motor in an aircraft. In some examples the output load terminal is connected to a power socket in an aircraft. There may be an output load terminal for each pair of semiconductor switches that is present in the electrical power converter. Each output load terminal may be connected together/to an output load, giving the desired output signal, e.g. three-phase AC when the output load terminal is connected to three pairs of semiconductor switches or two-phase AC when the output load terminal is connected to two pairs of semiconductor switches.

In some examples the electrical power converter might be used for converting solar power, e.g. the DC power source might be a solar panel, which the electrical power converter might convert to AC (e.g. three-phase).

According to a further aspect of the present disclosure, there is provided an aircraft power source, comprising the electrical power converter as described above.

DETAILED DESCRIPTION

Certain preferred examples of this disclosure will now be described, by way of example only, with reference to the accompanying drawings, in which:

FIG. 1 is a circuit diagram showing an electrical power converter 100, as is known in the art, the details of which are described in the background section above.

Figure 2:
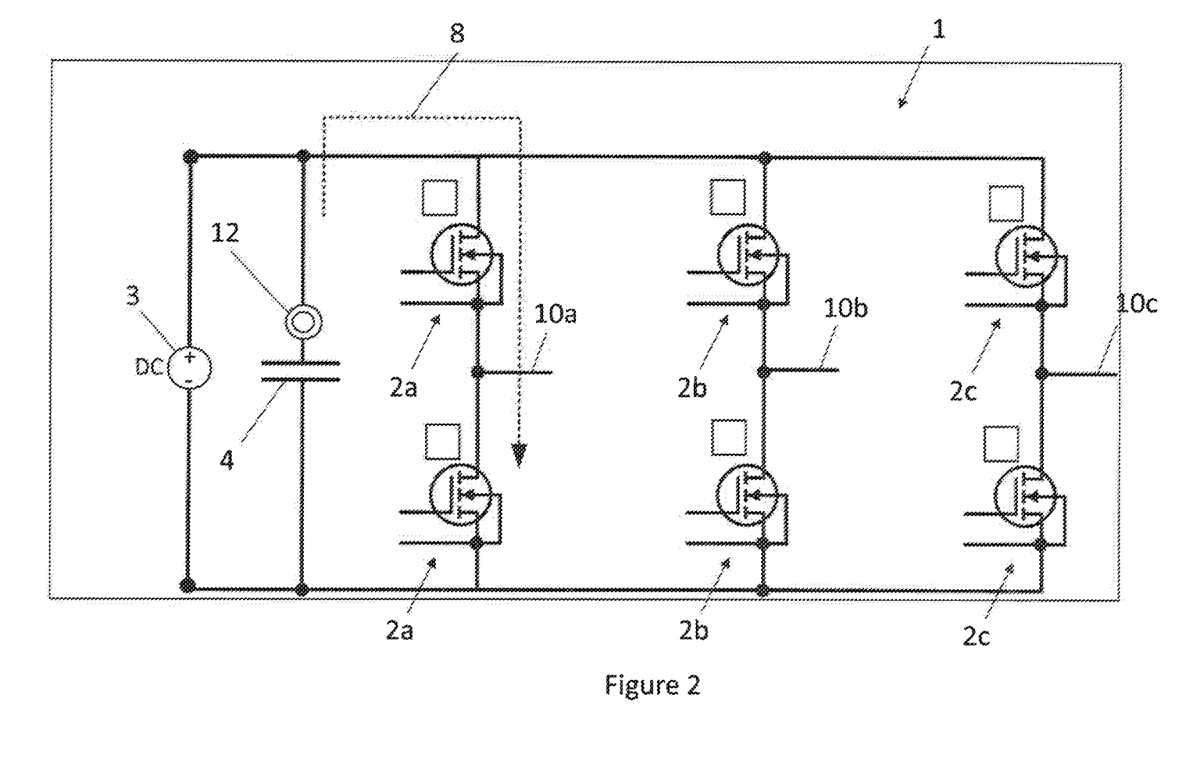
FIG. 2 is a schematic circuit diagram showing an electrical power converter according to an example of the present disclosure.

FIG. 2 shows an electrical power converter 1 according to an example of the present disclosure. In this particular example the electrical power converter 1 is a DC to AC three-phase inverter. The electrical power converter 1 includes a DC link capacitor 4, connected in parallel to three pairs of semiconductor switches 2a, 2b, and 2c. During normal operation the switches 2a, 2b, 2c, are switched in a known manner so that from a DC power source 3 providing an input load, a three-phase AC output is produced on the output load terminals 10a, 10b, 10c, which are connected between each pair of switches 2a, 2b, 2c.

When a fault occurs in the electrical power converter 1, for example a shoot-through condition, a fault current 8 is drawn from the DC link capacitor 4.

The electrical power converter 1 further includes an inductive current sensor 12. This inductive current sensor 12 is arranged to sense a primary current from a terminal of the DC link capacitor 4. The inductive current sensor 12 can be used to detect an over-current condition and to protect the electrical power converter 1, as described below with reference to FIG. 3. In this particular example the inductive current sensor is a Rogowski current sensor, also referred to as a Rogowski coil.

Figure 3:
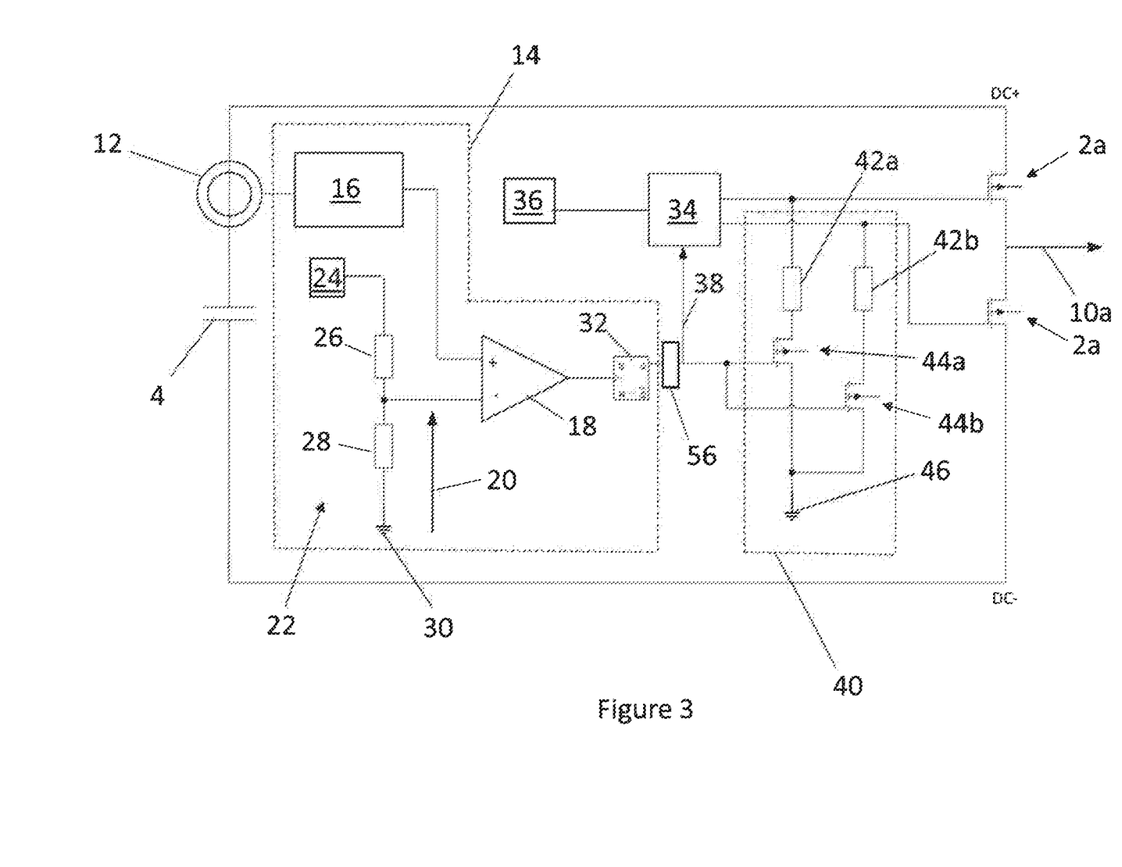
FIG. 3 is a schematic circuit diagram showing a portion of the circuit of FIG. 2.

FIG. 3 shows in greater detail certain components of the electrical power converter 1 of FIG. 2. Only one of the pairs of semiconductor switches 2a is shown. The inductive current sensor 12 is arranged to sense a primary current from a terminal of the DC link capacitor 4, and as a result a secondary current, which produces a voltage, is induced as a result of the magnetic field caused by the changing primary current. The inductive current sensor 12 supplies the generated voltage to a detection circuit 14 (indicated with a dashed outline) which is connected to the inductive current sensor 12.

The detection circuit 14 includes an integrator 16, which integrates the output voltage produced by the inductive current sensor 12. In this example the inductive current sensor 12 is a Rogowski coil. The voltage produced by the Rogowski coil 12 is proportional to the derivative of the current flowing from the terminal of the DC link capacitor 4, so the output of the integrator 16, which integrates this signal, is proportional to the current flowing from the DC link capacitor 4.

This integrated signal is then supplied to a first terminal of a comparator 18, which is part of the detection circuit 14. A threshold voltage 20 is applied to the other terminal of the comparator 18, using a threshold voltage supply circuit 22, which includes a voltage supply 24, a first resistor 26, a second resistor 28, and a ground connection 30. The threshold voltage 20 is drawn from between the first and second resistors 26, 28. The comparator 18 functions to compare the voltage derived from the inductive current sensor 12 (which relates to the current flowing from the DC link capacitor 4) with a threshold amount, and outputs a logic value representing whether this threshold value is exceeded, e.g. a logic 1 where the threshold is exceeded. This effectively indicates whether a threshold current from the DC link capacitor 4 has been exceeded, and the output signal can then be used to take action in the event of an over-current, caused by a fault. For this purpose the output of the comparator 18 is supplied to control logic 32.

In this example the control logic 32 provides its output signal to a harness connector 56, which may be an optical connection (although many implementations are possible). This harness connector 56 is connected to a driver 34, to provide the output signal to the driver 34. During normal operation the driver 34 receives a signal from a pulse width modulator unit 36, and uses this signal to control switching of each switch of the pair of switches 2a so as to produce the desired output alternating current. Where the detection circuit 14 has detected an over-current condition, i.e. the current from the DC link capacitor 4 exceeding a threshold, it supplies an output signal 38 to the driver 34. This output signal 38 disables the driver 34, which causes it to cease to make the switches 2a conductive. Since the switches are enhancement-type switches, which are in an off state at zero gate-source voltage, the disabling of the driver 34 changes the switches 2a to a non-conductive state. If, alternatively, depletion-type switches were used, the circuit would instead need to be arranged to cause the driver 34 to supply a voltage to the switches 2a, so as to make them non-conductive.

The logic 32 is further configured to connect the gate side of at least one of the switches 2a (i.e. the insulated side of the switch) to ground, using a grounding portion 40 to which it is connected. The grounding portion 40 includes two resistors 42a, 42b, two (grounding) semiconductor switches 44a, 44b, and a ground connection 46. A first one of the two resistors 42a and a first one of the grounding semiconductor switches 44a are connected between a first of the semiconductor switches 2a and the ground connection 46, and similarly a second one of the two resistors 42b and a second one of the grounding semiconductor switches 44b are connected between a second of the semiconductor switches 2a and the ground connection 46. When an overcurrent is detected, the logic 32 causes each of the semiconductor switches 44a, 44b to become conductive, so that the gate terminals of the switches 2a are connected to ground 46, via the respective resistors 42a, 42b. This causes the switches 2a to each be turned off at a specific rate.

Figure 4:
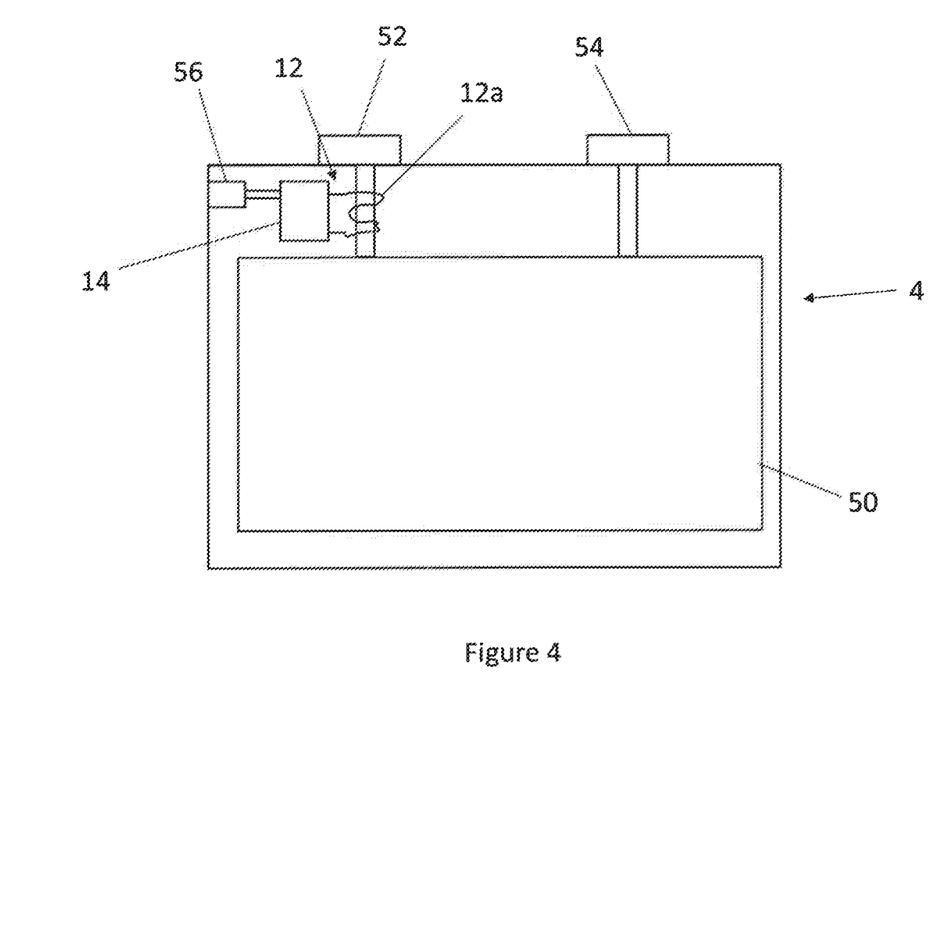
FIG. 4 is a schematic drawing showing an example arrangement of the inductive current sensor and DC link capacitor of FIG. 3.
Figure 5:
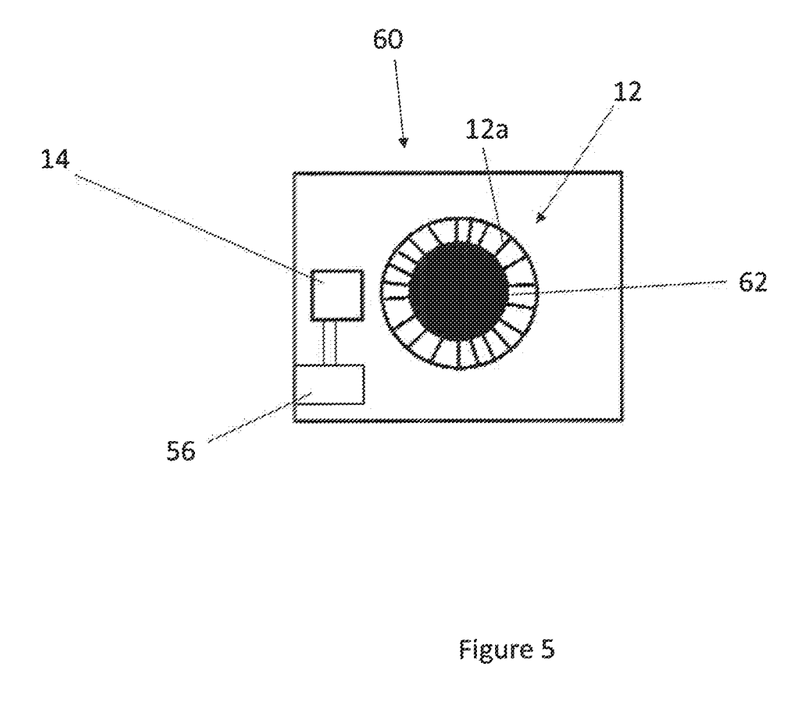
FIG. 5 is a schematic drawing showing a view from above of a printed circuit board containing an inductive current sensor, according to an alternative example arrangement of the inductive current sensor and DC link capacitor of FIG. 3.

FIGS. 4 and 5 shows examples of two ways in which the inductive current sensor 12 can be arranged to sense the primary current at a terminal of the DC link capacitor 4.

FIG. 4 shows the DC link capacitor 4, including a capacitor element 50, and capacitor terminals 52, 54. The coil 12a of the inductive current sensor 12 is wrapped freely around the capacitor terminal 52. This has the advantage that it can be easily installed in an existing system, and does not require any specialised components. However it is not very mechanically stable, and these components are expensive. The inductive current sensor 12 is then connected to the detection circuit 14, which is in turn connected to a harness connector 56, which enables connection of the over-current detection system to other parts of an electrical power converter. Furthermore, it will be appreciated that the capacitor 4 described in relation to FIG. 4 may find use in any application where it is beneficial to integrate a current sensing function into a capacitor, i.e. not only for detecting an over-current as described in relation to FIGS. 1-3.

FIG. 5 shows an alternative example of an arrangement for the inductive current sensor 12. The capacitor is not shown in this Figure. The arrangement still includes the coil 12a of the inductive current sensor 12, the detection circuit 14, and the harness connector 56. However in this case the coil 12a is embedded within a printed circuit board 60, which also contains the detection circuit 14 and the harness connector 56. In this example the printed circuit board 60 contains a hole, 62, sized so that the terminal of the capacitor 52 can be slid through the hole 62, thus positioning the embedded coil 12a around the capacitor terminal. This arrangement is very mechanically stable since the coil 12 is securely embedded within the PCB 60 and the PCB 60 is supported by the underlying capacitor. This mechanical stability is particularly advantageous for certain specific applications, where the electrical power converter is required to undergo a large amount of movement or accelerations, for example where the electrical power converter is intended for use in an aircraft. The PCB 60 may be mounted over a terminal of any suitable capacitor in order to add a current sensing function, i.e. not only in the over-current detection circuits described in relation to FIGS. 1-3.

Figure 6:
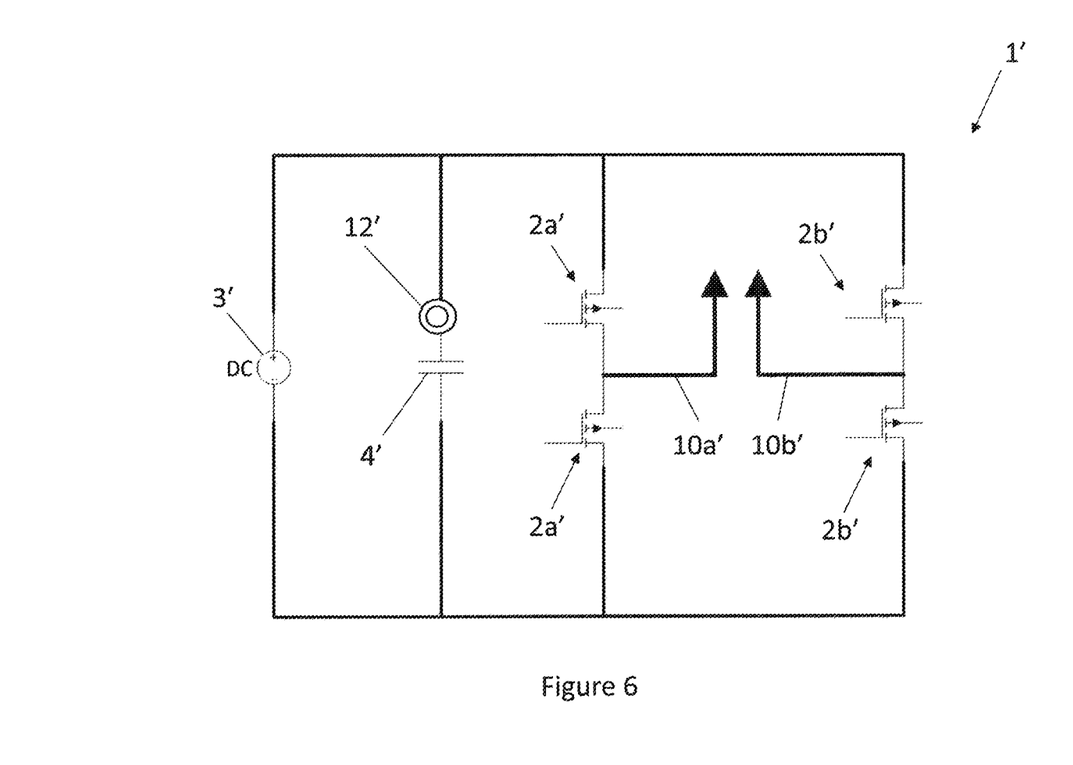
FIG. 6 is a circuit diagram showing an electrical power converter according to a second example of the present disclosure.
Figure 7:
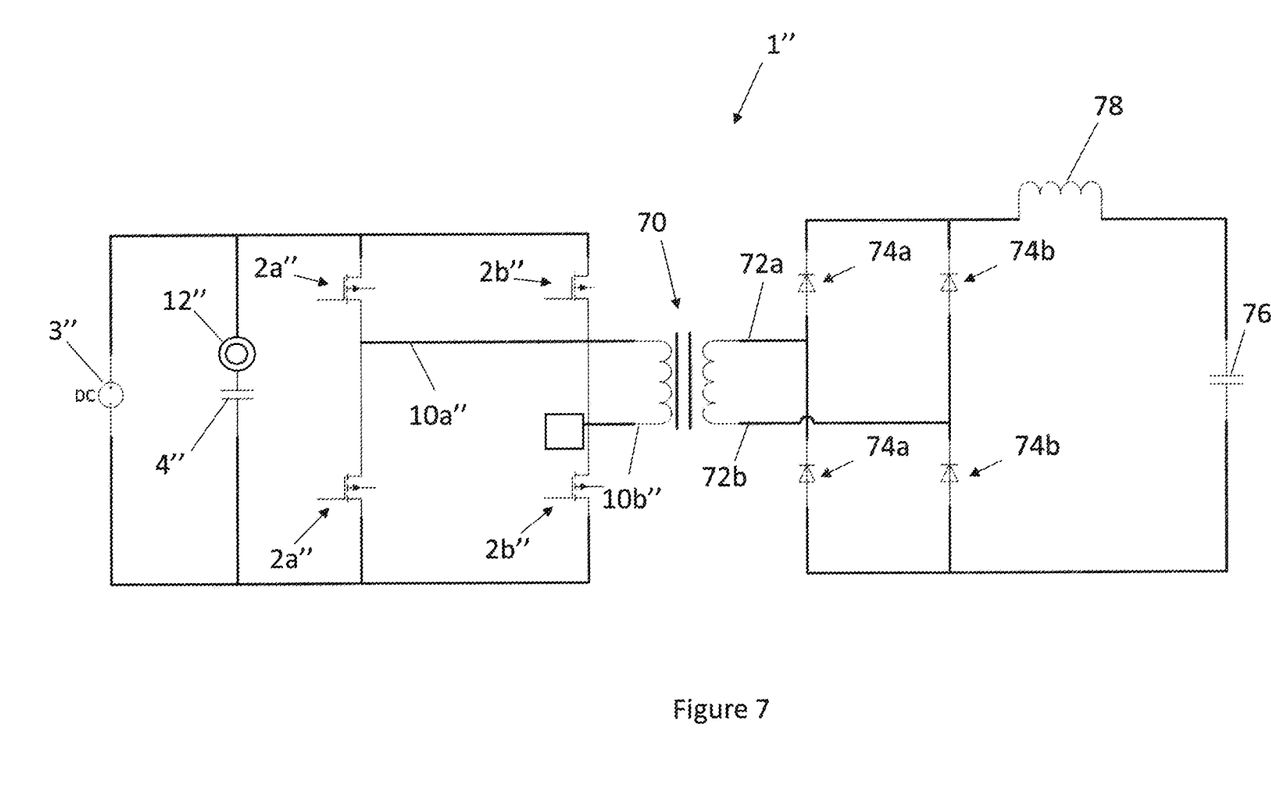
FIG. 7 is a circuit diagram showing an electrical power converter according to a third example of the present disclosure.

FIGS. 6 and 7 show some examples of alternative electrical power converters in which the described current detection arrangement can be implemented.

FIG. 6 shows a single-phase DC-AC inverter 1' which is an H-bridge arrangement. Like components of this converter 1' are labelled with the same reference numerals as the example three-phase inverter 1 of FIG. 2, but with reference numerals denoted with an apostrophe, i.e. 1' rather than 1. Thus it will be appreciated that the single-phase DC-AC inverter 1' includes a DC-link capacitor 4', connected in parallel to two pairs of semiconductor switches 2a', 2b'. During normal operation the switches 2a', 2b' are switched in a known manner so that from a DC power source 3' an AC output is produced on the output load terminals 10a', 10b', which are connected between each pair of switches 2a', 2b'. Over-current detection is carried out using an inductive current sensor 12', in the same manner as described above with reference to the first example.

FIG. 7 shows an isolated DC-DC converter 1". Like components of this converter 1" are again labelled with the same reference numerals as the example three-phase inverter 1 of FIG. 2, but with reference numerals denoted with two apostrophes, i.e. 1" rather than 1. The isolated DC-DC converter 1" includes a DC link capacitor 4", connected in parallel to two pairs of semiconductor switches 2a", 2b". During normal operation the switches 2a", 2b" are switched in a known manner so that from a DC power source 3" an AC output is produced on the output load terminals 10a", 10b", which are connected between each pair of switches 2a", 2b".

A transformer 70 is used to provide isolation between the input and output portions of the circuit 1". The transformer 70 connects to the output terminals 10a", 10b", and then the secondary portion of the transformer 70 connects to a rectifier portion of the DC-DC converter 1", which converts the AC output from the output terminals 10a", 10b" into DC current. Specifically, the secondary part of the transformer 70 connects to input terminals 72a, 72b of the rectifier part of the DC-DC converter 1". The rectifier part of the circuit also includes two pairs of diodes 74a, 74b, connected in parallel, a capacitor 76, in parallel with the pairs of diodes and a transformer coil 78 in series with the capacitor. These function together to convert the AC output received from the first part of the converter into direct current. Over-current detection is carried out using an inductive current sensor 12", in the same manner as described above with reference to the first example.

A detailed description of the functioning of the inductive current sensors 12', 12" in these devices will not be described again, since it will be understood by the skilled person that it functions in the same manner as described above with reference to FIG. 3.

The skilled person will understand that this arrangement could also be implemented in a variety of other electrical power converter topologies. However it is particularly advantageous when implemented in the higher power level converters, e.g. such as those types described above.

It will be appreciated by those skilled in the art that the disclosure has been illustrated by describing one or more specific aspects thereof, but is not limited to these aspects; many variations and modifications are possible, within the scope of the accompanying claims.

The invention claimed is:

1. An electrical power converter, comprising:
a DC link capacitor configured for connection to a DC power source to provide an input load;
at least one pair of semiconductor switches connected in parallel with the DC link capacitor and positioned on either side of an output load terminal;
an inductive current sensor configured to sense a primary current from a terminal of the DC link capacitor, wherein the inductive current sensor is embedded within the DC link capacitor or a printed circuit board on which the terminal of the DC link capacitor is mounted; and
a detection circuit connected to the inductive current sensor and configured to monitor for an over-current condition and to produce an output that causes one or more of the at least one pair of semiconductor switches to be switched to a non-conducting state when the over-current condition is detected.

2. The electrical power converter of claim 1, wherein the inductive current sensor is a Rogowski current sensor.

3. The electrical power converter of claim 1, wherein:
the inductive current sensor is embedded within the printed circuit board; and
the printed circuit board includes a harness connector configured to provide, via an optical connection, the output produced by the detection circuit.

4. The electrical power converter of claim 3, wherein the printed circuit board further comprises the detection circuit.

5. The electrical power converter of claim 1, wherein the detection circuit comprises an integrator configured to integrate a secondary current generated in the inductive current sensor by the primary current.

6. The electrical power converter of claim 1, wherein the detection circuit comprises a comparator configured to compare a secondary current generated in the inductive current sensor by the primary current to a threshold.

7. The electrical power converter of claim 1, further comprising at least one driver configured to control switching of the one or more of the at least one pair of semiconductor switches, wherein the detection circuit is connected to the driver and is configured to disable the driver when the over-current condition is detected.

8. The electrical power converter of claim 7, wherein the at least one driver is configured to:
receive a pulse width modulated (PWM) signal from a pulse width modulator;
control switching of the one or more of the at least one pair of semiconductor switches to produce an alternating current output based on the PWM signal; and
in response to receiving the output produced by the detection circuit, stop making the one or more of the at least one pair of semiconductor switches conductive.

9. The electrical power converter of claim 1, further comprising a grounding portion, which comprises a ground connection, wherein the detection circuit is connected to the grounding portion and is configured to connect the one or more of the at least one pair of semiconductor switches to the ground connection when the over-current condition is detected.

10. The electrical power converter of claim 1, wherein the at least one pair of semiconductor switches comprises silicon carbide switches.

11. The electrical power converter of claim 1, wherein the electrical power converter comprises more than one DC link capacitor, and more than one inductive current sensor, wherein each inductive current sensor is configured to sense a primary current from a terminal of a respective DC link capacitor.

12. The electrical power converter of claim 1, wherein the electrical power converter is a direct-current to alternating-current three phase inverter.

13. The electrical power converter of claim 1, wherein the electrical power converter is configured to provide a power of at least one kW.

14. An aircraft power source, comprising the electrical power converter of claim 1.

15. The electrical power converter of claim 1, further comprising:
a grounding circuit that includes a ground connection, the grounding circuit connected to control logic of the detection circuit;
wherein the control logic is configured to connect gate terminals of the one or more of the at least one pair of semiconductor switches to the ground connection when the over-current condition is detected.

16. The electrical power converter of claim 1, wherein the one or more of the at least one pair of semiconductor switches comprise enhancement-type switches configured to be non-conducting at a zero gate-source voltage.

17. A capacitor comprising:
terminals configured to connect to a DC power source; and
an inductive current sensor embedded in the capacitor, wherein the inductive current sensor comprises a coil wrapped around one of the terminals.

18. The capacitor of claim 17, further comprising a detection circuit connected to the inductive current sensor and configured to monitor for an over-current condition and to produce an output.

19. The capacitor of claim 18, wherein the detection circuit comprises:
an integrator configured to integrate a secondary current generated in the inductive current sensor, the secondary current induced as a result of a primary current from the one of the terminals that the coil is wrapped around; and
a comparator configured to receive an integrated signal from the integrator and compare the integrated signal to a threshold voltage.

20. The capacitor of claim 19, wherein the detection circuit further comprises a control logic configured to:
receive a comparison result from the comparator; and
provide, to a harness connector, the output produced by the detection circuit based on the comparison result, the output configured to disable a driver connected to the detection circuit via the harness connector when the over-current condition is detected.

* * * * *